(12) United States Patent
Coker

(10) Patent No.: US 10,610,822 B2
(45) Date of Patent: Apr. 7, 2020

(54) PREPARATION OF ASYMMETRIC POROUS MATERIALS

(71) Applicant: National Technology & Engineering Solutions of Sandia, LLC, Albuquerque, NM (US)

(72) Inventor: Eric N. Coker, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 669 days.

(21) Appl. No.: 14/667,749

(22) Filed: Mar. 25, 2015

(65) Prior Publication Data

US 2015/0196872 A1 Jul. 16, 2015

Related U.S. Application Data

(63) Continuation of application No. 13/538,527, filed on Jun. 29, 2012, now abandoned, which is a continuation of application No. 12/511,095, filed on Jul. 29, 2009, now Pat. No. 8,236,211, which is a continuation-in-part of application No. 11/501,199, filed on Aug. 8, 2006, now abandoned.

(51) Int. Cl.
| | |
|---|---|
| B32B 5/18 | (2006.01) |
| B01D 53/22 | (2006.01) |
| B01D 71/02 | (2006.01) |
| B29C 67/20 | (2006.01) |
| B01D 67/00 | (2006.01) |
| B29C 44/56 | (2006.01) |
| B82Y 30/00 | (2011.01) |

(52) U.S. Cl.
CPC ....... *B01D 53/228* (2013.01); *B01D 67/0051* (2013.01); *B01D 67/0083* (2013.01); *B01D 67/0086* (2013.01); *B01D 71/028* (2013.01); *B29C 44/56* (2013.01); *B29C 67/202* (2013.01); *B82Y 30/00* (2013.01); *B01D 2325/022* (2013.01); *Y10T 428/24997* (2015.04); *Y10T 428/249969* (2015.04); *Y10T 428/249978* (2015.04)

(58) Field of Classification Search
CPC ................ B01D 2325/022; Y10T 428/299975
See application file for complete search history.

(56) References Cited

U.S. PATENT DOCUMENTS

| | | | | |
|---|---|---|---|---|
| 2,837,440 | A * | 6/1958 | Boivin | B29C 67/20 106/122 |
| 4,711,287 | A | 12/1987 | Kuwabara et al. | |
| 5,095,847 | A | 3/1992 | Coffer | |
| 5,151,110 | A | 9/1992 | Bein et al. | |
| 5,163,498 | A | 11/1992 | Kantner et al. | |
| 5,624,674 | A | 4/1997 | Seare, Jr. | |
| 5,681,572 | A | 10/1997 | Seare, Jr. | |
| 6,542,682 | B2 | 4/2003 | Cotteverte et al. | |
| 6,733,828 | B2 | 5/2004 | Chao et al. | |
| 6,773,797 | B1 * | 8/2004 | Wang | B32B 27/20 210/500.27 |
| 7,166,161 | B2 | 1/2007 | Lazarev et al. | |
| 2001/0019037 | A1 | 9/2001 | Zakhidov et al. | |
| 2002/0142172 | A1 * | 10/2002 | Brinker | B01D 53/22 428/446 |
| 2008/0220153 | A1 * | 9/2008 | Mukherjee | H01G 4/10 427/79 |

OTHER PUBLICATIONS

Xia, Z.; Wedel, A.; Danz, R.; "Charge Storage and its Dynamics in Porous Polytetrafluoroethylene PTFE) Film Electrets"; IEEE Transactions on Dielectrics and Electrical Insulation; 2003, vol. 10, p. 102-108.*
Che et al., "Synthesis and characterization of chiral mesoporous silica," 2004, Nature, vol. 429, pp. 281-284.
Coker, E.N., et al., "Novel, Size-controlled Pt Cluster Electrocatalysts for H2 Fuel Cells," Am. Chem. Soc., Div. Fuel Chem., 2004, 49(2), 681-682.
Fuertes, A.B., et al., "Control of mesoporous structure of carbons synthesised using a mesostructured silica as template," 2003, Microporous and Mesoporous Materials, vol. 62, pp. 177-190.
Hulteen, J.C., et al., "A general template-based method for the preparation of nanomaterials," 1997, J. Mater. Chem., 7 (7), pp. 1075-1087.
Joo, S.H., et al., "Ordered nanoporous arrays of carbon supporting high dispersions of platinum nanoparticles," 2001, Nature, vol. 412, pp. 169-172.
Gundiah, G., et al., "Macroporous carbons prepared by templating silica spheres," 2001, Materials Research Bulletin, vol. 36, pp. 1751-1757.
Han, S., et al., "Direct fabrication of mesoporous carbons using in-situ polymerized silica gel networks as a template," 2003, Carbon, vol. 41, pp. 1525-1532.
Jun, S., et al., "Synthesis of New, Nanoporous Carbon with Hexagonally Ordered Mesostructure," 2000, J. Am. Chem. Soc., vol. 122, pp. 10712-10713.
Lebeau, B., et al., "Organized mesoporous solids: mechanism of formation and use as host materials to prepare carbon and oxide replicas," 2005, C.R. Chimie 8, pp. 597-607.
Ma, Z., et al., "Very High Surface Area Microporous Carbon with a Three-Dimensional Nano-Array Structure: Synthesis and Its Molecular Structure," 2001, Chem. Mater., vol. 13, pp. 4413-4415.
Polarz, S., et al., "Nanoporous Materials," 2002, Journal of Nanoscience and Nanotechnology 2, vol. 6, pp. 581-612.

(Continued)

*Primary Examiner* — Mark Ruthkosky
*Assistant Examiner* — Julia L Rummel
(74) *Attorney, Agent, or Firm* — Daniel J. Jenkins

(57) ABSTRACT

As asymmetric porous film structure formed by depositing a porous material film on a flexible substrate, and applying an anisotropic stress to the porous media on the flexible substrate, where the anisotropic stress results from a stress such as an applied mechanical force, a thermal gradient, and an applied voltage, to form an asymmetric porous material.

6 Claims, No Drawings

(56) References Cited

OTHER PUBLICATIONS

Ryoo, R., et al., "Synthesis of Highly Ordered Carbon Molecular Sieves via Template-Mediated Structural Transformation," 1999, The Journal of Physical Chemistry B, vol. 103, No. 37, pp. 7743-7746.
Sandhage, K.H., et al., "Novel, Bioclastic Route to Self-Assembled, 3D, Chemically Tailored Meso-Nanostructures: Shape-Preserving Reactive Conversion of Biosilica (Diatom) Microshells," 2002, Adv. Mater., vol. 14, No. 6, pp. 429-433.
Shin, H.J., et al., "Template Synthesis of Asymmetrically Mesostructured Platinum Networks," 2001, J. Am. Chem. Soc., vol. 123, pp. 1246-1247.
Taguchi, A., et al., "Ordered mesoporous materials in catalysis," 2005, Microporous and Mesoporous Materials, vol. 77, pages 1-45.
Velikov, K.P., et al., "Photonic crystals of shape-anisotropic colloidal particles," 2002, Applied Physics Letters, vol. 81, No. 5, pp. 838-840.
Zakhidov, A.A., et al., "Carbon Structures with Three-Dimensional Periodicity at Optical Wavelengths," 1998, Science, vol. 282, 1998, pp. 897-901.
Davis, M, Lobo, R., "Zeolite and Molecular Sieve Synthesis" Chemistry of Materials, Apr. 1992, pp. 156-768.

\* cited by examiner

PREPARATION OF ASYMMETRIC POROUS MATERIALS

RELATED APPLICATIONS

This application is a continuation of U.S. patent application Ser. No. 13/538,527. Entitled "Preparation of Asymmetric Porous Materials", filed Jun. 29, 2012, which is a continuation of U.S. patent application Ser. No. 12/511,095. Entitled "Preparation of Asymmetric Porous Materials," filed on Jul. 29, 2009, now U.S. Pat. No. 8,236,211, which is a continuation-in-part application of U.S. patent application Ser. No. 11/501,199, entitled "Nanocasting Method to Prepare Porous Materials," filed on Aug. 8, 2006, abandoned, and claims priority to and the benefit of the filing of said U.S. Patent Applications. The specification and claims thereof are incorporated herein by reference.

STATEMENT REGARDING FEDERALLY SPONSORED RESEARCH OR DEVELOPMENT

This invention was made with Government support under Contract No. DE-AC04-94AL85000 awarded by the Department of Energy. The Government has certain rights in the invention.

BACKGROUND OF THE INVENTION

The invention describes a method for preparing porous materials and, more particularly, to a method for preparing materials with a controlled, asymmetric, three-dimensional porous structure.

Microporous, mesoporous, and macroporous materials have become ubiquitous, and play important roles in sensors, chemical and physical separations, catalysis, photonics, and quantum dot utilization, among other applications. Unfortunately, direct synthesis of such materials has been limited to a few chemical compositions, most commonly silicas, aluminosilicates and aluminophosphates. The ability to prepare such porous structures in other compositional phase spaces and with asymmetric structures would enable a marriage of physical and chemical control, leading to new applications and devices. Asymmetric or chiral porous nanostructured materials are rare, and would be useful in catalysis, separations and sensing sciences. The availability of such materials would have enormous impact on the chemical and petrochemical industries, as well as in sensors for chiral molecules, and non-linear optical devices. In particular, the chirality of a molecule can determine whether it is therapeutic, benign, or toxic in a physiological environment. For instance P(−) sarin and tabun are several orders of magnitude more toxic than their P(+) stereoisomers. The ability to discriminate on a molecular level between chiral enantiomers is of paramount importance for sensors, chem/bio-warfare agent remediation, and synthesis of pharmaceuticals, agro-chemicals, fragrances, and foodstuffs. However, the reliable detection and processing of specific chiral molecules remains a challenge. Gas-chromatography using chiral columns is typically used for identification of enantiomers or pre-concentration prior to processing, but column retention times are 10 s of minutes. Chiral sensors based upon layers of chiral organic species are useful for only one, or a limited number of compounds. Very few chiral catalysts and sorbents exist since nature constrains materials to symmetric structures. Chiral membranes are based on organic polymers, thus operation is limited to relatively low temperatures.

Prior art dictates that inorganic coatings are rigid materials; however ultra-thin coatings of nano/micro-porous materials can show flexibility. Flexion can potentially enable geometrically-controlled asymmetric/chiral coatings leading to versatile, fast-responsive sensor/catalyst/adsorber platforms operable at high temperature. Fabrication on piezoelectric substrates could enable tuning for specific molecules via electrical signal, or rapid scanning for a range of molecules.

DESCRIPTION OF SPECIFIC EMBODIMENTS

The present invention provides for producing porous films on a flexible substrate where the porous films have asymmetric physical properties resulting from an applied stress. In one embodiment, a porous film is deposited on a flexible substrate and an anisotropic stress is applied to the resulting deposited film/substrate system to produce asymmetrical properties. The substrate material can be comprised of a variety of materials including, but not limited to, a glass material, a Si material, metals, and polymers where the substrate thickness is limited such that the substrate can be stressed to flex without fracturing. In one embodiment, the stress can be applied using mechanical force, either compressive or tensile. In another embodiment, a thermal stress can be applied if a substrate material is used that has a non-homogeneous thermal expansion coefficient such that an applied thermal stress induces asymmetric porous physical properties. In another embodiment, the substrate can be comprised of materials, such as aluminum nitride, that have piezoelectric properties such that the asymmetric stress can be applied using a controlled voltage to control the applied stress and the resulting degree of asymmetry in the porous structure. In another embodiment the substrate can be comprised of materials that undergo a thermally-induced deformation, such as a "shape memory alloy".

In another embodiment, the anisotropic stress is applied to the flexible substrate prior to porous film deposition; after the film is deposited, the anisotropic stress is removed and the relaxation of stress on the substrate imposes an applied anisotropic stress on the deposited porous film.

The porous film can be made from any material such that sufficient adhesion to the flexible substrate can be maintained and stresses to the flexible substrate are propagated to the porous film. The chemical composition of the films can be varied over a broad spectrum (for example, silica, alumina, aluminosilicate, titania, organic, and organic-inorganic hybrid), and the use of templated/self-assembled ordered porosity synthesis methods to form the films enables pore size to be effectively controlled. In general, the thickness of the porous film is limited to approximately 100 nanometers with a minimum thickness of approximately 10 nanometers.

In one embodiment, the porous film is a cast of a porous medium formed by infiltrating a pore-filling medium into a host porous structure deposited on a flexible substrate where in the pore-filling medium is then polymerized to form an interconnected cast. The host porous structure is removed leaving the interconnected cast. Applying an anisotropic stress to said film of the cast porous material on the flexible substrate produces a porous material with asymmetrical properties on a substrate; only a minor departure from centro-symmetry of a pore is required for shape-selective properties. The nature and magnitude of anisotropic stress required to achieve a particular pore asymmetry depends on the intrinsic flexibility of molecular structures, film thickness, and interfacial bonding energy. In this embodiment, a nano- or meso-structured material (host) with the desired pore architecture is cast; that is, an image of the void space within the host is made through intercalation and polymerization of organic monomers, with the host material as a deposited film on a flexible substrate. The host is selectively digested, leaving the self-supporting cast that retains the connectivity of the host's pore structure. This process can be applied at any length scale from microporous zeolites to macroporous synthetic opals and beyond, thus enabling the preparation of, for example, molecular recognition platforms and molecular separation devices (nano- or micro-scale), gas adsorption/storage and catalyst support media (micro- or meso-scale), and photonic lattices (macroscale). The host structure on the flexible substrate is anisotropically stressed to produce a host structure with asymmetrical properties. In one embodiment, the porous film is a replica porous media formed by infiltrating a pore-filling medium into a host porous structure deposited on a flexible substrate where in the pore-filling medium is then polymerized to form an interconnected cast. The host porous structure is removed and a material is formed around the interconnected cast. Removing the interconnected cast forms a replica porous material on a flexible substrate. Applying an anisotropic stress to said film of the replica porous material on the flexible substrate produces a porous material with asymmetrical properties on a substrate; only a minor departure from centro-symmetry of a pore is required for shape-selective properties. The nature and magnitude of anisotropic stress required to achieve a particular pore asymmetry depends on the intrinsic flexibility of molecular structures, film thickness, and interfacial bonding energy. In this embodiment, a nano- or meso-structured material (host) with the desired pore architecture is cast; that is, an image of the void space within the host is made through intercalation and polymerization of organic monomers, with the host material as a deposited film on a flexible substrate. The host is selectively digested, leaving the self-supporting cast that retains the connectivity of the host's pore structure. Using the self-supporting cast as a template, the structure of the host is then replicated, from virtually any material, using solution or vapor phase deposition techniques. The cast is then removed, leaving a replica of the host structure, with a new, tailored composition. This process can be applied at any length scale from microporous zeolites to macroporous synthetic opals and beyond, thus enabling the preparation of, for example, molecular recognition platforms and molecular separation devices (nano- or micro-scale), gas adsorption/ storage and catalyst support media (micro- or meso-scale), and photonic lattices (macroscale). The host structure on the flexible substrate is anisotropically stressed to produce a host structure with asymmetrical properties.

The capability to prepare novel solid materials with chiral features is highly significant. Application of anisotropic stresses to the cast during replication can enable chiral catalysis, sensing and separations with the asymmetric replica. In contrast, self-assembled materials (such as zeolites and mesoporous silicas) are highly symmetric by the laws of nature. In addition, specific chemical functionality, such as metal nanoparticle catalysts, has been introduced into the host material and transferred to the final material via the cast.

Molecular modeling can be used to predict cast and replica formation, and structure-property relationships for diverse nanostructures, starting from a model composition, such as titania or silica. In addition, modeling the deformation of a flexible cast under applied force can be performed to allow prediction of the asymmetry of the resulting replica, enabling the fabrication of tailored chiral solids.

In one embodiment of the method of the present invention, a material (host) possessing the desired porosity/structure (from nano- to macro-scale) is prepared on a flexible substrate by established synthetic routes or acquired from a commercial source. The host is generally pre-treated to remove adsorbates and any structure-directing agents from the pore spaces. This typically involves evacuation, optionally at elevated temperature (150-600° C.). A pore-filling medium is then infiltrated into the host, where the pore-filling medium is a material that can penetrate the porosity of the host, be treated to form a solid material, and be subsequently removed through further treatment. The pore-filling medium will be typically a liquid monomeric organic species capable of undergoing thermal or photo polymerization to yield an interconnected polymer. Examples include, but are not limited to, furfuryl alcohol, sucrose, and pyrrole. The pore-filling medium can be optionally diluted with a suitable solvent prior to infiltration. Suitable solvents include, but are not limited to, acetone, ethanol, methanol, and isopropyl alcohol. The pore-filling medium can be optionally adsorbed into the pores of the host as a vapor. The pore-filled host is then optionally treated under vacuum to remove any air from the pores and assist the pore-filling medium to fully penetrate the host's porosity. The pore-filling medium is then polymerized by appropriate treatment (such as by heating to 80-150° C., exposure to ultra-violet radiation, or other treatment, depending on the polymerization mechanism) to form a solid polymer cast of the interconnected pore structure. The porous host may then be removed through acid or base digestion, or other suitable treatment, to leave the solid interconnected cast of the pore structure of the host. The porous host on the flexible substrate is then anisotropically stressed, such as by physically supplying tensile, compressive, or torsional mechanical force to the substrate.

The surface properties (such as hydrophobicity and functionality) of the polymer can be optionally altered to optimize interaction between the cast and the replica precursor, either before, or after removal of the host or before or after application of the anisotropic stress. This can be achieved through choice of monomeric species and also post polymerization treatment. For instance, the polymer can be optionally treated at high temperature under inert atmosphere to convert the bulk to carbon. Further, this carbon cast can be functionalized, such as by partial oxidation or acid treatment, before or after removing the host.

The solid cast is used as the template for formation of the final replica material with desired nanoscale or mesoscale porosity and/or functional features. This step can be achieved through several different processes, including electroless solution deposition, electrochemical deposition, chemical or physical vapor deposition (CVD or PVD), sol infiltration with in-situ gelation, or other similar method known in the art. In the case of solution-based approaches, optional evacuation of the (solid cast plus solution) mixture can be used to ensure efficient pore filling by the replica precursor solution. Furthermore, by forming a cast of an aligned array of host crystals attached to a flexible substrate, asymmetrical, or chiral porous materials will be obtained upon application of anisotropic stresses to the substrate before, during, or after deposition of the replica phase.

Once the composite has been formed, optional thermal, photo, or other standard treatment can be used to cure the replica material and enhance its rigidity. The cast is then removed by oxidation, chemical extraction (for example, ultraviolet/ozone or solvent extraction), or other suitable process, leaving the replica material with the desired pore structure. Transmission electron microscopy images have shown that replica porous materials can be satisfactorily produced. Additionally, the transference of specific chemical functionality can be achieved through introduction of the desired functionality into the host material and subsequent transference to the replica via the organic cast. The first stages of this procedure have been shown in one embodiment whereby Pt nanoparticles stabilized in a zeolite were transferred to a carbon cast.

Optionally, prior to actual preparation of a material with a porous structure replicating a host material, modeling can be performed to design the three-dimensional porous structure of the host material. This modeling can be performed to design specific structural and physical properties of the material. The modeling can also be used to choose the composition of the material in the final, three-dimensional structure to obtain a material with not only desired physical properties but chemical properties as well.

Example 1

Growth of a zeolite layer onto a glass slide substrate, and subsequent deformation of substrate and zeolite layer.

A precursor solution was prepared, containing silica ($SiO_2$), tetrapropyl ammonium hydroxide (TPAOH), ethanol ($C_2H_5OH$), and deionzed water ($H_2O$) in the following molar ratios:

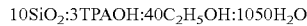

10$SiO_2$:3TPAOH:40$C_2H_5OH$:1050$H_2O$

The $SiO_2$ and ethanol were formed from the hydrolysis of tetraethyl orthosilicate (TEOS, $Si(OC_2H_5)_4$). When heated in a sealed vessel at approximately 165° C. under autogeneous pressure, this solution is known to yield coatings of zeolite type silicalite-I on many different types of surface.

Approximately 3.1 g TEOS was mixed with 2.25 g of a 40 wt.-% solution of TPAOH in water and 27.9 g deionized water. The mixture was sealed in a plastic bottle and shaken at room temperature using a wrist-action shaker for 2 hours. The solution was then decanted into a Teflon-lined stainless-steel high-pressure reaction vessel. The Teflon liner had internal dimensions of 25 mm diameter by 38 mm depth with lid closed. A glass slide measuring 22 mm×35 mm×0.15 mm was then immersed into the solution in the Teflon-lined vessel such that the glass slide was positioned with its long axis approximately vertical.

Once the stainless-steel outer vessel was sealed, the reaction vessel was placed in a pre-heated oven at 165° C., and allowed to stand undisturbed for 2.5 hours at 165° C. It was then removed from the oven and allowed to cool in static air. The vessel was then opened, and the glass slide was removed from the vessel, rinsed with water and dried.

The zeolite-coated glass slide could then be physically deformed to render the pore structure of the zeolite asymmetric.

Example 2

Growth of a zeolite layer onto a pre-deformed glass slide substrate, and subsequent removal of deformation from substrate.

A precursor solution was prepared as described in Example 1. The precursor solution was sealed in a plastic bottle and shaken at room temperature using a wrist-action shaker for 2 hours. The solution was then decanted into a Teflon-lined stainless-steel high-pressure reaction vessel. A glass slide measuring 22 mm×40 mm×0.15 mm was then immersed into the solution in the Teflon-lined vessel such that the glass slide was positioned with its long axis approximately vertical. The length of the glass (40 mm) was slightly longer than the internal height of the Teflon liner (38 mm), such that placing the Teflon lid onto the liner caused the glass to bend.

Once the stainless-steel outer vessel was sealed, the reaction vessel was placed in a pre-heated oven at 165° C., and allowed to stand undisturbed for 2.5 hours. It was then removed from the oven and allowed to cool in static air. The vessel was then opened, and the glass was removed from the vessel, rinsed with water and dried.

Upon removing the lid of the Teflon liner, the deformation of the glass was relieved and the glass became planar again. The pore structure of the silicalite-I layer which grew on the glass was then asymmetric because it had formed as a symmetric pore structure on the deformed glass slide, and therefore became distorted upon removing the deformation from the glass.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A porous film structure, comprising:
   a post-stressed, relaxed substrate comprising one of a piezoelectric material, a glass material, a Si material, a metal, or a shape memory alloy;
   an anisotropically-stressed microporous film upon and in contact with the post-stressed, relaxed substrate;
   wherein said anisotropically-stressed microporous film comprises a plurality of asymmetric pores; and
   wherein the porous film structure is formed by a process comprising:
   applying an anisotropic stress to a substrate, said anisotropic stress being applied by applying a mechanical force, a thermal stress, or a voltage to said substrate;
   depositing a microporous film on a surface of the anisotropically-stressed substrate;
   and removing the applied anisotropic stress from the substrate, thereby forming the post-stressed, relaxed substrate, anisotropically stressing the microporous film, and forming the plurality of asymmetric pores within the microporous film.

2. The structure of claim 1, wherein the porous film has a thickness between approximately 10 nm and 100 nm.

3. The structure of claim 1, wherein said piezoelectric material is aluminum nitride.

4. The structure of claim 1 wherein said microporous film comprises a material selected from the group consisting of silica, alumina, aluminosilicate, titania, an organic material, and an organic-inorganic hybrid material.

5. The structure of claim 1 wherein said microporous film comprises a zeolite.

6. The structure of claim 1, wherein the asymmetric pore structure comprises asymmetric chiral pores.

* * * * *